United States Patent
Vissenberg et al.

(10) Patent No.: US 10,595,514 B2
(45) Date of Patent: Mar. 24, 2020

(54) AQUARIUM LIGHTING

(71) Applicant: PHILIPS LIGHTING HOLDING B.V., Eindhoven (NL)

(72) Inventors: Michel Cornelis Josephus Marie Vissenberg, Eindhoven (NL); Lucas Louis Marie Vogels, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 140 days.

(21) Appl. No.: 15/550,413

(22) PCT Filed: Feb. 11, 2016

(86) PCT No.: PCT/EP2016/052919
§ 371 (c)(1),
(2) Date: Aug. 11, 2017

(87) PCT Pub. No.: WO2016/128514
PCT Pub. Date: Aug. 18, 2016

(65) Prior Publication Data
US 2018/0027779 A1   Feb. 1, 2018

(30) Foreign Application Priority Data
Feb. 12, 2015   (EP) .................................... 15154864

(51) Int. Cl.
| | |
|---|---|
| *A01K 63/06* | (2006.01) |
| *F21V 5/00* | (2018.01) |
| *F21V 7/00* | (2006.01) |
| *F21Y 105/12* | (2016.01) |
| *F21Y 115/10* | (2016.01) |

(52) U.S. Cl.
CPC .............. *A01K 63/06* (2013.01); *F21V 5/007* (2013.01); *F21V 7/0083* (2013.01); *F21Y 2105/12* (2016.08); *F21Y 2115/10* (2016.08)

(58) Field of Classification Search
CPC .... A01K 63/00; A01K 63/003; A01K 63/006; A01K 63/047
USPC ......... 119/200, 265–267, 269; 362/231, 253, 362/249.02, 223, 805, 147, 267, 217.05, 362/217.01, 218
See application file for complete search history.

(56) References Cited

U.S. PATENT DOCUMENTS

| | | | |
|---|---|---|---|
| 8,646,934 B2 | 2/2014 | Fredricks | |
| 8,657,463 B2* | 2/2014 | Lichten | ................... F21S 8/063 362/231 |
| 10,221,857 B2* | 3/2019 | Niemiec | ............... F04D 29/545 |
| 10,231,304 B2* | 3/2019 | Fredricks | ........... H05B 33/0845 |
| 2003/0137829 A1 | 7/2003 | Ayers | |
| 2009/0279295 A1 | 11/2009 | Van Der Poel et al. | |

(Continued)

FOREIGN PATENT DOCUMENTS

JP    2010246486 A    11/2010

*Primary Examiner* — Richard T Price, Jr.
(74) *Attorney, Agent, or Firm* — Daniel J. Piotrowski

(57) ABSTRACT

An aquarium lighting system has a set of lighting elements (30) each with a beam shaping element (60, 70) for passing first light which is emitted from the lighting element at an angle to the normal below a threshold and for processing second light which is emitted from the lighting element at an angle to the normal above the threshold. The processing gives a greater amount of scattering compared to the passed light so that direct light at steep angles is avoided.

14 Claims, 3 Drawing Sheets

(56) References Cited

U.S. PATENT DOCUMENTS

| | | |
|---|---|---|
| 2012/0044713 A1 | 2/2012 | Chiang et al. |
| 2012/0326610 A1* | 12/2012 | Lawyer .................. A01K 63/06 315/117 |
| 2013/0033851 A1 | 2/2013 | Wang |
| 2013/0157394 A1 | 6/2013 | Grajcar |
| 2013/0174792 A1 | 7/2013 | Delabbio |
| 2014/0104832 A1 | 4/2014 | Duong et al. |

* cited by examiner

AQUARIUM LIGHTING

CROSS-REFERENCE TO PRIOR APPLICATIONS

This application is the U.S. National Phase application under 35 U.S.C. § 371 of International Application No. PCT/EP2016/052919, filed on Feb. 11, 2016 which claims the benefit of European Patent Application No. 15154864.1, filed on Feb. 12, 2015. These applications are hereby incorporated by reference herein.

FIELD OF THE INVENTION

This invention relates to lighting arrangements for aquarium lighting.

BACKGROUND OF THE INVENTION

When directional light enters a water surface, so-called caustic patterns are projected on the bottom. Such projected patterns occur when the light is highly collimated (such as light from the sun or a from a narrow beam light source) or when the source is very small such as an LED. Large diffuse sources, like conventional tungsten tubes, or indirect lighting, do not produce caustics.

In aquarium lighting, LEDs have the advantage of high efficacy and easy spectral tunability. However, the resulting array of point-like sources may result in a restlessly moving caustic pattern in and around the aquarium, as well as colour patterns and coloured shadows.

While the caustic patterns to some extent may be appreciated inside the aquarium (since it is caused by the water dynamics), part of the light may also leak out of the aquarium and create a restless pattern on the floor in the vicinity of the aquarium. This may be found to be a disturbing effect. It occurs when light enters the water at a steep angle to the vertical normal (in fact above 63 degrees to the vertical). This effect is illustrated in FIG. 1, in which beam 10 has a steep angle to the vertical above 63 degrees, whereas beam 12 has a shallower angle below 63 degrees.

Water has a relatively low refractive index (typically n=1.34), and this means that light at these high incident angles is not reflected by total internal reflection at the side wall, but it can refract out of the water volume and land on the floor. This light which has leaked from the sides of the aquarium may then project restless caustic patterns onto the floor.

Light 12 at smaller angles stays within the aquarium by total internal reflection at the sides of the aquarium.

A solution to keep all light within the water volume is to limit the light to beam angles well within 63 degrees to the vertical direction, for example by placing a collimator on each LED. While this directional lighting is more efficient since more light stays inside the aquarium, it also has some drawbacks. Directional lighting, in particular with hard cut off angles, produces so-called scalloping on the back side of the aquarium, which is visible as alternating bright and dark areas, as well poor illumination of the objects in the aquarium. In particular, a high contrast between the top and bottom parts of an object can result, with loss of visible shape details. Furthermore, homogenous lighting is recognized as benefiting coral growth, such as the speed of growth. Directional light from above may for example result in bleaching of the bottom parts of the coral, which is visible when viewing the aquarium from the front.

U.S. Pat. No. 8,646,934 discloses an aquarium lighting system in which lenses are used to define precise angular outputs from lighting elements.

There is therefore a need for an aquarium lighting solution which is efficient and versatile, for example enabling implementation using LEDs, and which gives a minimum of disturbing caustic patterns on the floor, as well as controlling the caustic pattern (e.g. the frequency) in the aquarium. Scalloping or harsh shadows should also be avoided in the aquarium.

SUMMARY OF THE INVENTION

The invention is defined by the claims.

According to examples of lighting systems presented in this disclosure, there is provided an aquarium lighting system comprising:

a base layer;

a set of lighting elements mounted on the base layer;

a beam shaping element associated with each lighting element, wherein the beam shaping element is for passing first light which is emitted from the lighting element at an angle to the normal below a threshold and for processing second light which is emitted from the lighting element at an angle to the normal above the threshold, the processing resulting in a greater amount of scattering compared to the passed first light.

The beam shaping element is an optical element which may for example surround or partially surround each lighting element, which may be an LED or a cluster of LEDs that are closely spaced together. Thus, one beam shaping element may be associated with multiple lighting elements. Each lighting element is associated with a beam shaping element, but not necessary a beam shaping element which is unique to that lighting element.

The beam shaping element blocks the direct view to the lighting element at angles above the threshold, which thus functions as a cut off angle. The light which is received beyond the cut off angle is processed, for example redistributed by a light scattering element. Thus, most of the light with angles smaller than the cut off angle is allowed to pass without scattering, or with much less scattering than the steeper processed light.

The beam processing comprises a scattering function. Thus, if a reflecting surface is used for the scattering, it is preferably a diffuse reflector rather than a specular reflector. In this way, the angular spread of the output light is not limited to a particular cut off angle, but there is a cut off angle for direct light (i.e. which undergoes no reflections between the lighting element and the water).

The projection of caustic patterns on the floor may in this way be reduced or completely removed by blocking the direct light at high angles. However, light at high angles is desirable to avoid scalloping and poor object lighting, so this light is not entirely blocked but rather it is processed to increase the degree of scattering, thereby retaining a larger virtual light source. The light at large angles to the normal will in this way come from a large virtual source, and create blurry projections that are less noticeable than sharp caustic patterns. The direct lighting originates from a real point source. In this way, the optical function is not simply a beam limiting function, but it provides different beam processing for shallow angles compared to wide angles.

The scattering of the light at high angles will also result in some of the scattered light being redirected to overlap with the direct (less scattered) light. In this way, the caustic effect inside the aquarium is also reduced. In particular, there caustic effect is also more diffuse. The processing of second light thus eliminates or substantially eliminates the caustic effect outside the aquarium and also reduces the caustic effect inside the aquarium.

To reduce the caustic effect further inside the aquarium, the function of passing the first light may also include a diffusion (scattering) function, but with reduced scattering compared to the processing of the second light.

The base layer may for example comprise a printed circuit board. The lighting elements may comprise LEDs, for example formed as an array on the printed circuit board.

The threshold is preferably in the range 45 to 63 degrees, for example in the range 55 to 63 degrees, and for example in the range 55 to 60 degrees. In this way, direct light can be prevented which would escape through the side walls of the aquarium.

In one example, the beam shaping element comprises a scattering reflector having a scattering and reflecting side wall at opposite sides of the lighting element or surrounding the lighting element. This side wall may surround the lighting element or it may be on opposite lateral sides, depending on the lighting element design. The side wall defines an aperture which then forms the cut off angle. However, the cut off light is also projected, after reflecting on the scattering surface.

The scattering reflector may have a tapered side wall which widens outwardly with increasing distance from the lighting element. Alternatively, the scattering reflector may have a stepped side wall.

In another example, the beam shaping element comprises a plate having a patterned diffuser, with an opening in the diffuser pattern for passing the first light. The opening defines the cut off angle, and light provided to the opening is passed without diffusion.

In another example, the beam shaping element comprises a patterned light guide having a patterned opening in the light guide for passing the first light. Light with a steeper angle than the threshold passes into the light guide and then may for example be emitted with an essentially random location and direction.

The first light may be passed with no optical processing at all. However, the beam shaping element may instead comprise a scattering element for scattering said first light, with a smaller amount of scattering than the processing of the second light. The (reduced amount of) scattering of the first light reduces the effect of caustic patterns inside the aquarium.

The disclosure also provides an aquarium comprising a water container and a lighting system as defined above. The lighting system may project light centred in a vertically downward direction to the water below. The lighting system may be distributed over an area which is similar to the area of the water container to provide illumination to the full water volume of the aquarium. In use, the lighting system may for example be positioned 10 to 25 cm above the water surface.

The disclosure also provides a method of lighting an aquarium, comprising:

providing a light output from a set of lighting elements mounted above the water of the aquarium;

passing first light which is emitted from the lighting elements at an angle to the normal below a threshold; and processing second light which is emitted from the lighting elements at an angle to the normal above the threshold, the processing resulting in a greater amount of scattering compared to the passed first light.

The threshold is for example in the range 45 to 63 degrees, more preferably in the range 55 to 63 degrees, even more preferably in the range 55 to 60 degrees.

BRIEF DESCRIPTION OF THE DRAWINGS

Examples will now be described in detail with reference to the accompanying drawings, in which.

DETAILED DESCRIPTION OF THE EMBODIMENTS

The disclosure provides an aquarium lighting system which has a set of lighting elements each associated with a beam shaping element for passing first light which is emitted from the lighting element at an angle to the normal below a threshold. The beam shaping element processes second light which is emitted from the lighting element at an angle to the normal above the threshold. The processing gives a greater amount of scattering compared to the passed light so that direct light at steep angles is avoided.

Figure 1:
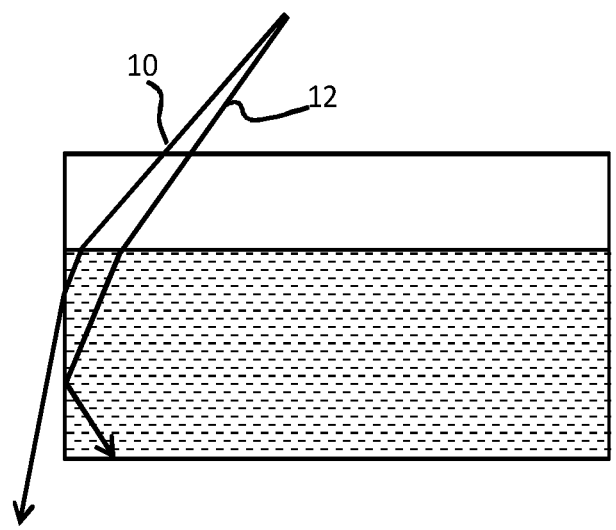
FIG. 1 shows how light of certain angles can escape through the side wall of an aquarium.
Figure 2:
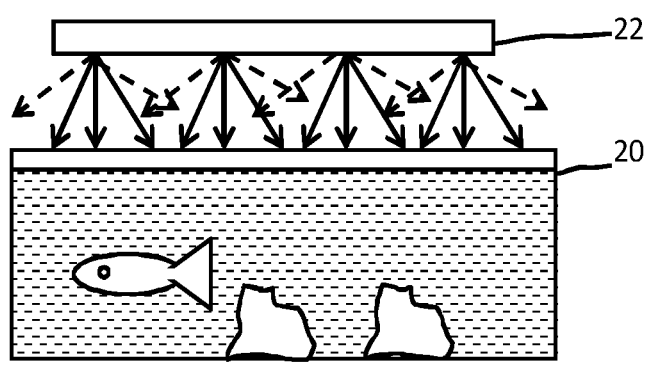
FIG. 2 shows an aquarium with a lighting system.

FIG. 2 shows an aquarium which comprises a water vessel 20 having a lighting system 22 suspended over the water. The lighting system projects light essentially downwardly to the water below. The lighting system is sized to provide illumination to the full water volume of the aquarium. The lighting system may for example be positioned 10 to 30 cm above the water surface.

Light which is directed downwardly near to the vertical (shown as solid lines) is provided without any significant beam shaping or scattering. The lighting system preferably comprises an array of LEDs, and the light at these shallow angles to the vertical appears as an array of point light sources. The light is trapped by total internal reflection at the side walls of the aquarium, and it may create a caustic pattern at the base of the aquarium. Light which is directed downwardly far from the vertical (shown as dashed lines) is subjected to scattering. The light at these steeper angles to the vertical appears to have originated from a large area source as a result of the scattering. Light which remains, after the scattering, at a steep angle may escape through the side walls of the aquarium, but the caustic light pattern effect is reduced for this light. By allowing light at the steep angles (but implementing beam shaping to increase scattering) the quality of the illumination within the aquarium is maintained.

Figure 3:
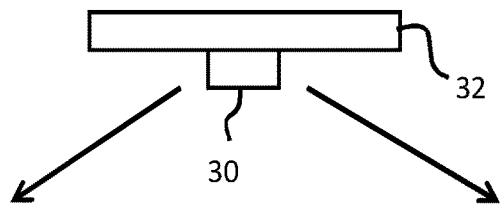
FIG. 3 shows a lighting element with no beam shaping at the output.

FIG. 3 shows an LED provided over a base layer, such as a printed circuit board, with no beam shaping. The LED appears as a point light source, and emits light over a wide angle range, for example 80 degrees each side of the normal.

The disclosure provides a set of such lighting elements, and with a beam shaping element associated with each lighting element.

The beam shaping element is for passing first light which is emitted from the lighting element at an angle to the normal below a threshold and for processing second light which is emitted from the lighting element at an angle to the normal above the threshold, the processing resulting in a greater amount of scattering compared to the passed first light.

The beam shaping element is an optical element which may for example surround or partially surround its associated lighting element. The threshold angle functions as a cut off angle for the light which has been passed, but light beyond the cut off angle is also emitted, but after some light redistribution. Thus, most of the light with angles smaller than the cut off angle is allowed to pass without scattering, or with much less scattering than the steeper processed light.

FIGS. 4 to 7 show examples of different beam shaping elements for an individual LED.

In all cases, the beam shaping element will be designed taking into account the shape of the lighting element. For example for point like sources such as an individual LED, or for a cluster of LEDs, the beam shaping element is a rotationally symmetric element disposed around the LED or LED cluster. For a linear source, such as a line of closely spaced LEDs, the beam shaping element may also be linear. In this case, the beam shaping element may comprise a strip on each lateral side of the linear light source. The cut off angle is then only needed in the lateral direction (perpendicular to the line direction). For other distributions of light sources, the geometry of the beam shaping element is designed to match the distributions of light sources. For example for a circle or polygonal shape of light sources, the beam shaping element has a corresponding shape.

Figure 4:
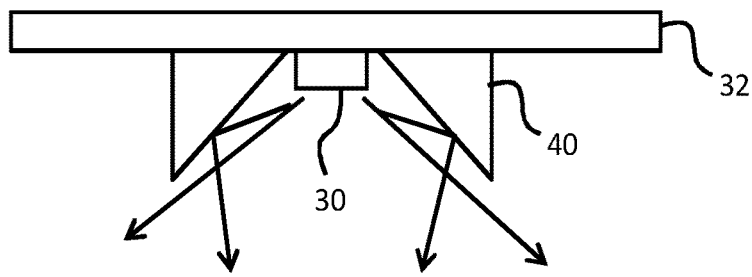
FIG. 4 shows a first example of beam shaping system.
Figure 5:
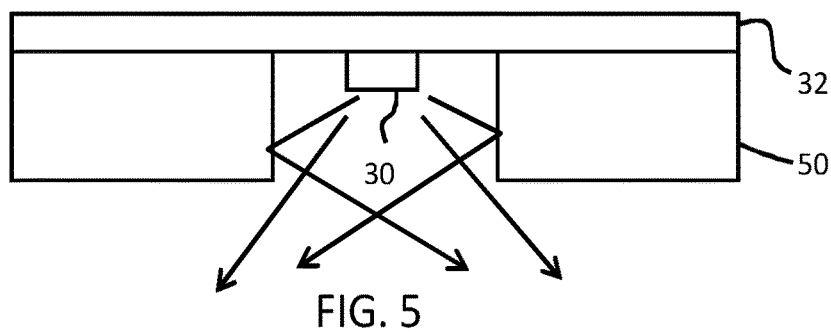
FIG. 5 shows a second example of beam shaping system.

FIG. 4 shows a first example, in which a white reflector 40 is placed around the associated LED (or along the edge of a line of LEDs). The direct view to the LED is blocked beyond a certain angle, and this light is redistributed by diffuse (scattering) reflection. FIG. 4 shows the beam shaping element with a tapered sides, which widens outwardly with increasing distance from the LED 30. The tapered sides can be used to redirect much of the light at steep angles to be directed in a more downward direction, although the scattering means that some light will still be emitted at large angles to the normal. Alternatively, the scattering reflector 50 may have a stepped side wall as shown in the second example of FIG. 5. In this case, the steep angle light is subjected to scattering, but not additionally steered towards a normal downward direction as in the example of FIG. 4.

Figure 6:
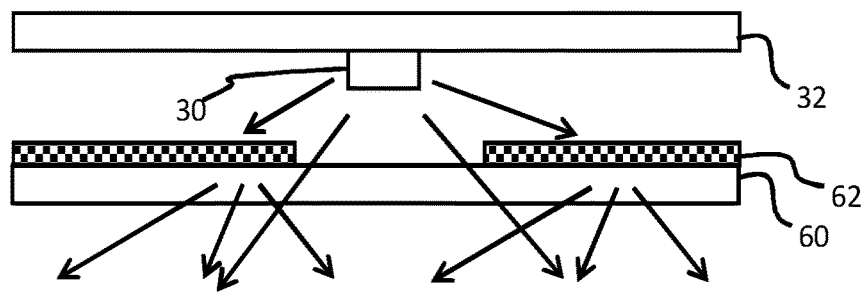
FIG. 6 shows a third example of beam shaping system.

FIG. 6 shows a third example in which the direct view of the LED 30 is blocked by using a clear cover plate 60 with a patterned scattering element 62 (which may be on the LED side of the cover plate or on the opposite side). The pattern defines an opening aligned with the LED. For light with angles smaller than the cut off angle, the plate is clear (or only very lightly scattering) at the opening while at larger angles, further away from the LED, the scattering is stronger. The transition between the low and high amounts of scattering is preferably soft to avoid sharp cut off effects.

The scattering element may be reflective and/or transmissive, and may be achieved by a coating, for example using paint dots with varying density or size, a surface treatment for example surface roughness, or a variation of scattering particle density within the bulk of the material.

Figure 7:
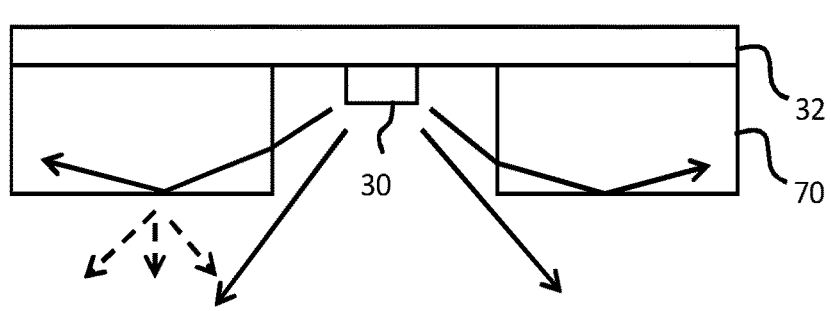
FIG. 7 shows a fourth example of beam shaping system.

FIG. 7 shows a fourth example in which the cut off is created by a light guiding element 70. The light guiding element has an opening aligned with the LED, so that steep light can enter the light guide at a side face (which is in the normal direction). Above the cut off angle, light enters this side face and is then captured by the light guide 70. It is subsequently coupled out from the light guide by a scattering element or surface. The scattering element may again be reflecting or transmitting, at any side of the light guide, and it may have a varying scattering strength depending on the position. For example a scattering surface pattern may be applied to the outer surface at the bottom of the light guide 70.

The angle threshold between the zero or low scattering and the higher scattering is for example in the range 45 to 63 degrees, more preferably in the range 55 to 63 degrees, and even more preferably in the range 55 to 60 degrees.

In all examples above, the first light is passed with no optical processing at all. However, the beam shaping element may instead comprise a scattering element for scattering the first (directional) light, with a smaller amount of scattering than the processing of the second light. This may comprise a lightly scattering diffusing plate mounted over the side walls (FIGS. 4 and 5), or a portion of reduced scatting in the window (FIG. 6) or a lightly scattering diffusing plate mounted over the light guide (FIG. 7).

The lighting scattering diffusing plate may be clear outside the central window, or else a uniform lighting scattering plate may cover the entire lighting arrangement. In this case, there are two scattering mechanisms in series for the large angle light, but only the single scattering element for the small angle, central, light. This central light thus remains more directional than the larger angle light. The scattering of the first light reduces the effect of caustic patterns inside the aquarium by reducing the directionality of the light entering the aquarium.

As mentioned above, the lighting elements may be formed individually or in groups.

Figure 8:
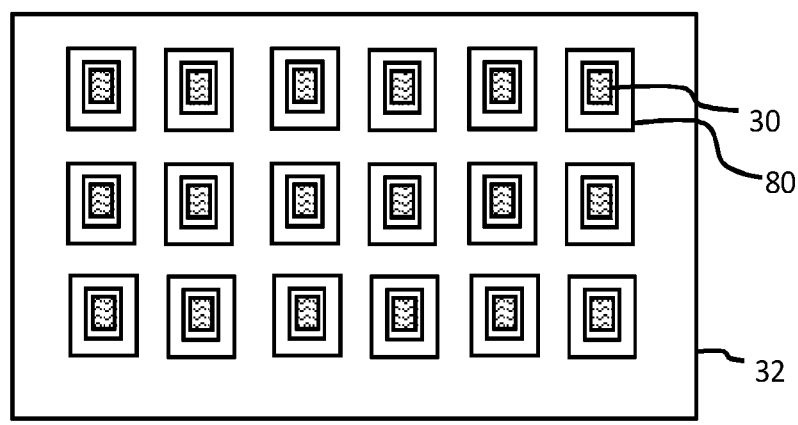
FIG. 8 shows a first example of lighting system.
Figure 9:
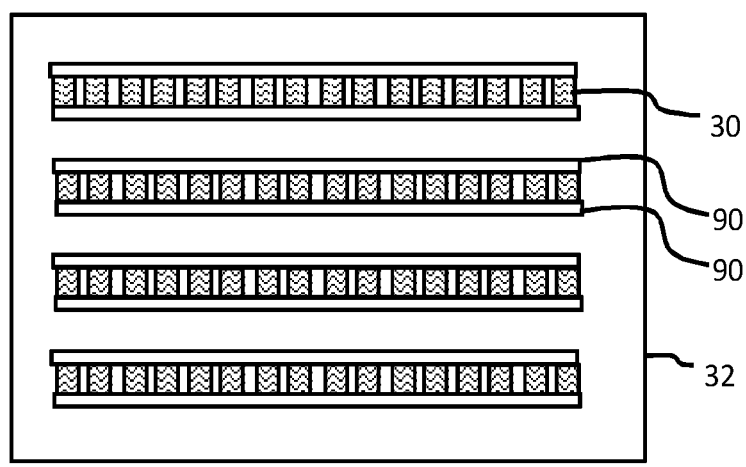
FIG. 9 shows a second example of lighting system.

FIG. 8 shows an array of LEDs formed over a two dimensional printed circuit board 32, and each LED having a surrounding beam shaping element 80. FIG. 9 shows an array of LEDs formed over a two dimensional area, and the LEDs formed in lines. Each line has a beam shaping element 90 to each lateral side.

A number of different beam shaping elements have been described above. A lighting system may combine different types of beam shaping element into one product.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. An aquarium lighting system comprising:
  a base layer;
  a set of lighting elements mounted on the base layer;
  a beam shaping element associated with each lighting element, wherein the beam shaping element is for passing first light which is emitted from the lighting element at an angle to the normal below a threshold and for processing second light which is emitted from the lighting element at an angle to the normal above the threshold, the processing resulting in a greater amount of scattering of the second light compared to the passed first light,
  wherein the beam shaping element comprises a plate having a patterned diffuser, with an opening in the diffuser pattern for passing the first light, or
  wherein the beam shaping element comprises a patterned light guide for capturing the second light into the light guide and subsequently reemitting the second light from the light guide, the patterned light guide having a patterned opening in the light guide for passing the first light.

2. A system as claimed in claim 1, wherein the base layer comprises a printed circuit board.

3. A system as claimed in claim 1, wherein the lighting elements each comprise an LED.

4. A system as claimed in claim 1, wherein the lighting elements are arranged in a geometric distribution on the base layer and wherein the beam shaping element is designed to match the geometric distributions of lighting elements on the base layer.

5. A system as claimed in claim 4, wherein the geometric distribution of lighting elements in the base layer is linear, circular or polygonal.

6. A system as claimed in claim 1, wherein the threshold is in the range 45 to 63 degrees, more preferably in the range 55 to 63 degrees and even more preferably in the range 55 to 60 degrees.

7. A system as claimed in claim 1, wherein the beam shaping element further comprises a scattering element for scattering said first light, with a smaller amount of scattering than the scattering provided by the processing of the second light.

8. An aquarium comprising a water container and a lighting system as claimed in claim 1 for suspension over the water container.

9. An aquarium as claimed in claim 8, wherein in use the lighting system is positioned 10 to 30 cm above the water surface.

10. The system as claimed in claim 1, wherein the base layer is mounted above a water surface.

11. A method of lighting an aquarium, comprising:
providing a light output from a set of lighting elements mounted above the water of the aquarium;
passing first light which is emitted from the lighting elements at an angle to the normal below a threshold; and
processing second light which is emitted from the lighting elements at an angle to the normal above the threshold by means of a plate having a patterned diffuser, with an opening in the diffuser pattern for passing the first light, or by means of a patterned light guide capturing the second light into the light guide and subsequently reemitting the second light from the light guide, the patterned light guide having a patterned opening in the light guide for passing the first light,
wherein the processing step resulting in a greater amount of scattering compared to the passed first light.

12. A method as claimed in claim 11, wherein the threshold is in the range 45 to 63 degrees, more preferably in the range 55 to 63 degrees, even more preferably in the range 55 to 60 degrees.

13. The method as claimed in claim 11, wherein the step of providing a light output includes mounting the set of lighting elements above a water surface.

14. An aquarium lighting system comprising: a base layer; a set of lighting elements mounted on the base layer; a beam shaping element associated with each lighting element, wherein the beam shaping element is for passing first light which is emitted from the lighting element at an angle to the normal below a threshold and for processing second light which is emitted from the lighting element at an angle to the normal above the threshold, the processing resulting in a greater amount of scattering of the second light compared to the passed first light, and wherein the beam shaping element comprises a patterned light guide for capturing the second light into the light guide and subsequently reemitting the second light from the light guide, the patterned light guide having a patterned opening in the light guide for passing the first light.

* * * * *